Oct. 18, 1932. F. P. RYDER 1,882,952
VINER
Filed March 8, 1930 2 Sheets-Sheet 1
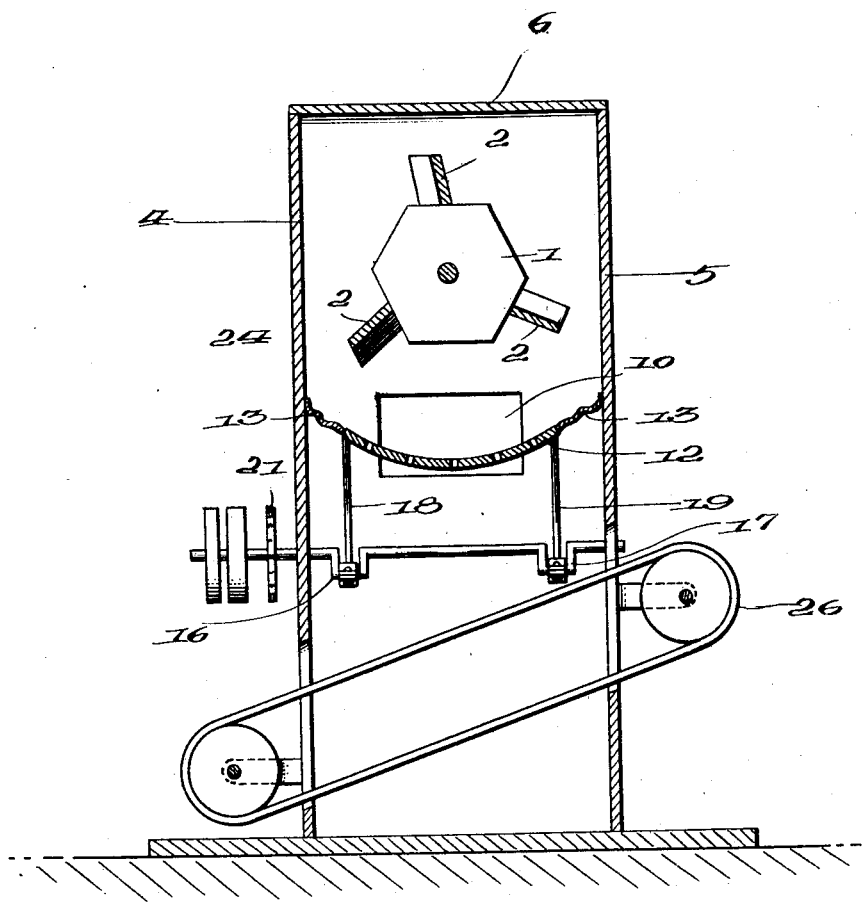

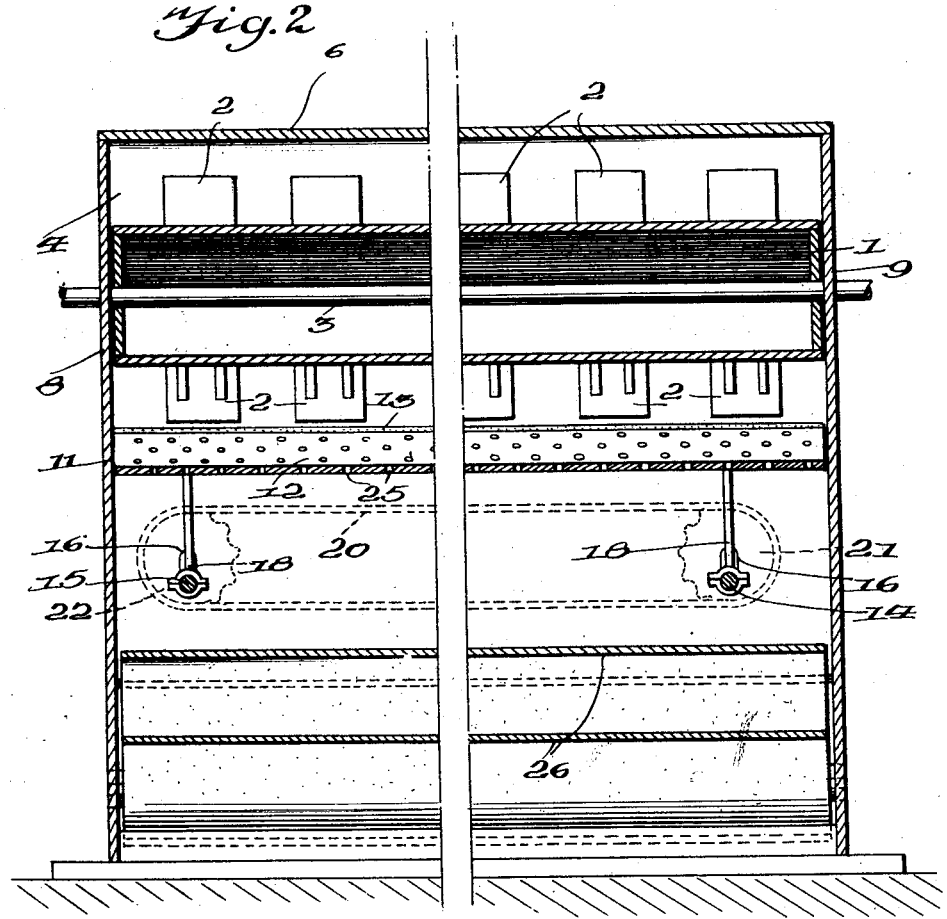
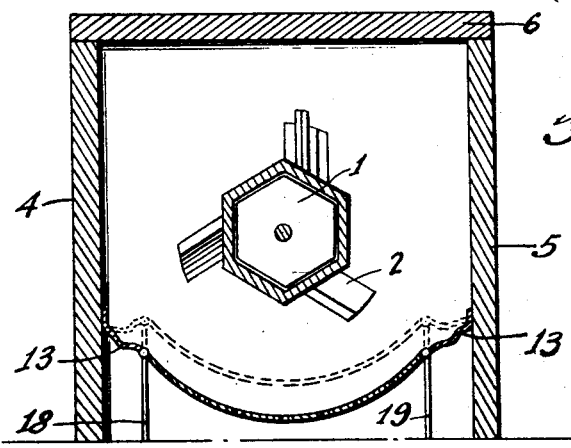

Patented Oct. 18, 1932

1,882,952

UNITED STATES PATENT OFFICE

FRANK PITTIS RYDER, OF NIAGARA FALLS, NEW YORK

VINER

Application filed March 8, 1930. Serial No. 434,351.

My invention relates to viners, that is, machines for threshing green peas or beans in which the vines bearing the pea and bean pods are introduced into the machine and subjected to a threshing operation to open the pods and release the peas or beans.

Viners as ordinarily used comprise an inner rotating member having outwardly extending arms, termed the beater cylinder and an outer rotating member termed the lifting cylinder or reel, concentric with the beater cylinder, and having inwardly projecting bars. The beater cylinder is rotated at a high rate of speed usually 200 revolutions per minute so that 600 beater edges pass a given point each minute, while the lifting cylinder is rotated in the same direction with the beater cylinder but at a much slower speed. The vines introduced into the space between the two cylinders are lifted by the bars of the outer cylinder and, as these bars move upward, are allowed to drop into the path of movement of the beater arms of the rapidly rotating cylinder.

Owing to the high speed at which the beater cylinder must be rotated and the short interval of time between the passage of successive beater arms past a given point the vines dropping by gravity from the bars of the lifting cylinder can penetrate the path of the beater arms only a very short distance approximately three fourths of an inch and only the outside layer of the vine mass is subjected to hulling action.

It is the purpose of my invention to provide means by which the entire vine mass may come in full contact with the beaters by causing the vines to be forced or driven into the spaces between successive beater arms.

With the object above indicated and other objects hereinafter set forth, my invention consists in the construction and combination of elements hereinafter described and claimed.

Referring to the drawings:

Figure 1 is a vertical, sectional view midway between the ends of the beater cylinder of a viner embodying my invention.

Figure 2 is a longitudinal, central, sectional view of the same.

Figure 3 is a cross section of a viner embodying my invention indicating the operation of the vertically moving screen.

In the drawings 1 indicates a beater cylinder such as is used in viners of the type shown and described in the patent issued to R. P. Scott and J. A. and C. P. Chisholm, June 27, 1893, No. 500,299, consisting of a long rotating body usually hexagonal in cross section, having on each of its alternate faces a row of outwardly extending beater arms 2 suitably spaced apart and more or less inclined to the longitudinal axis of the cylinder so as to cause the vines upon which it operates to move from the end at which they are introduced toward the other end. The beater cylinder is carried by a shaft 3 which is driven by any convenient means as by the driving means shown in the patent referred to.

In the viners constructed under the patent above referred to the beater cylinder is arranged concentrically within a power rotated outer or lifting cylinder which, in operation, lifts the vines and drops them into the path of the beater arms 2. As ordinarily operated the speed of rotation of the beater cylinder is such that 600 beater arm edges pass a given point each minute so that only about a tenth of a second is permitted for vines, dropping by gravity, to drop between successive beater arms. The slight drop of the vines thus possible restricts the penetration of the vine mass into the path of the beaters to little if any more than three fourths of an inch and it is necessary, in order to secure effective beating action throughout the mass of vines to make the beater cylinder of considerable length so that by being subjected to successive blows of beater arms all of the vines will be effectively acted upon.

In the construction here shown the outer or lifting cylinder of the patent referred to is dispensed with. In place of it is an enclosing stationary casing having sides 4 and 5, top 6, and ends 8 and 9. End 9 has opening 10 for introduction of the vines and end 9 has opening 11 for discharge of the threshed vines.

Below the beater cylinder 1 is a curved screen 12 of sheet metal or other material sufficiently rigid to maintain its shape, curved in cross section on an arc approximately concentric with the axis of the beater cylinder 1 and extending throughout its length.

This screen 12 does not extend on either side to the sides 4 and 5 of the casing. Its side edges are spaced away from the sides of the casing a substantial distance, the gaps between its side edges and the sides of the casing being closed by strips 13 of flexible material such as rubber sheeting, these strips 13 being secured at their inner edges to the screen and at their outer edges to the sides 4 and 5 of the casing so as to permit free up and down movement to the screen while preventing any escape of vines or peas between the edges of the screen and the sides of the casing.

Below screen 12 at points near the ends of the screen are arranged cross shafts 14 and 15, each provided with two or more cranks 16 and 17, carrying pitmen 18, 19, the upper ends of which are pivotally connected to screen 12. Shafts 14 and 15 are connected, as by sprocket chain 20, engaging sprockets 21 on shaft 14 and 22 on shaft 15, for simultaneous operation and one of these shafts is provided with driving pulley 23. Operation of shafts 14 and 15 will, through the action of cranks 16, 17, and pitmen, 18, 19, reciprocate screen 12 up and down and will throw vines, indicated at 24, up into the path of beater arms 12, and by operating the shafts at such high speed of rotation that successive upward movements of the screen follow one after another so rapidly that the vines falling by gravity do not have time to drop the full distance to which the screen drops, the vines will be maintained in a state of suspension and successive upward movements of the screen will have the effect of upwardly directed blows. By reason of the vines being thus in suspension and subjected to successive upwardly directed blows they will be driven into the spaces between successive beater arms to a distance much greater than the distance to which vines dropped by the lifting cylinder of the usual viner can penetrate between successive beater arms so that the vine mass will be acted on not merely on its outer surface but throughout its extent.

Screen 12 is provided with perforations 25 of suitable shape and size to permit peas released from the pods to drop onto the apron 26 usual in viners.

The up and down movement of the screen is preferably from two to three inches. Instead of cranks, eccentrics may be used, it being essential only that the screen 12 be reciprocated vertically with sufficient rapidity to hurl the vine masses into the path of the beaters.

Having thus described my invention, what I claim is:—

1. In a viner, the combination with a beater cylinder having outward extending beater arms of a vertically movable element curved on an arc concentric with the beater cylinder arranged below the beater cylinder and adapted to support vines, of means for vertically reciprocating said vertically movable element to impel vines carried by it upward into the path of movement of the beater arms.

2. In a viner, the combination with a beater cylinder having outwardly extending beater arms of an enclosing casing and vertically movable element arranged below the beater cylinder and adapted to support vines, having its edges flexibly connected to the sides of the casing, and means for vertically reciprocating said vertically movable element to impel vines carried by it upward into the path of movement of the beater arms.

3. In a viner, the combination with a beater cylinder having outwardly extending beater arms of an enclosing casing, and a screen curved on an arc concentric with the beater cylinder of less width than the space between the sides of the casing, arranged below the beater cylinder, strips of flexible material connecting the side edges of the screen to the sides of the casing, and means for vertically reciprocating said screen.

4. In a viner, the combination with a beater cylinder having beater arms extending outwardly therefrom and so arranged as to cause vines to move longitudinally thereof of a vertically movable element to support vines arranged below and extending longitudinally of the beater cylinder and means for vertically reciprocating said movable element to impel vines carried by it upward into the path of movement of the beater arms.

5. In a viner, the combination with a beater cylinder having beater arms extending outwardly therefrom in planes inclined to the axis of the cylinder so as to cause vines to move longitudinally thereof, of a screen to support vines arranged below and extending longitudinally of the beater cylinder, and means for vertically reciprocating said screen to impel vines carried by it upward into the path of movement of the beater arms.

6. In a viner, the combination with a beater cylinder having beater arms extending outwardly therefrom in planes inclined to the axis of the cylinder so as to cause vines to move longitudinally thereof of an enclosing casing and a screen to support vines arranged below and extending longitudinally of the beater cylinder of less width than the space between the sides of the casing and means for vertically reciprocating said screen to impel vines carried by it upward into the path of movement of the beater arms.

In testimony whereof, I hereunto affix my signature.

FRANK PITTIS RYDER.